(12) United States Patent
Smith

(10) Patent No.: US 12,441,414 B2
(45) Date of Patent: Oct. 14, 2025

(54) TRUCK TAILGATE ASSEMBLY

(71) Applicants: Chester Dwayne Smith, Winfield, KS (US); Mary Ann Smith, Winfield, KS (US)

(72) Inventor: Chester Dwayne Smith, Winfield, KS (US)

(*) Notice: Subject to any disclaimer, the term of this patent is extended or adjusted under 35 U.S.C. 154(b) by 288 days.

(21) Appl. No.: 18/102,373

(22) Filed: Jan. 27, 2023

(65) Prior Publication Data

US 2023/0166800 A1    Jun. 1, 2023

Related U.S. Application Data

(60) Provisional application No. 63/309,747, filed on Feb. 14, 2022.

(51) Int. Cl.
*B62D 33/00* (2006.01)
*B62D 33/027* (2006.01)

(52) U.S. Cl.
CPC .................. *B62D 33/0273* (2013.01)

(58) Field of Classification Search
CPC . B62D 33/03; B62D 33/0276; B62D 33/0273

USPC .................................................. 296/50
See application file for complete search history.

(56) References Cited

U.S. PATENT DOCUMENTS

| | | | |
|---|---|---|---|
| 11,584,451 B2 * | 2/2023 | Gibbs | B62D 33/03 |
| 11,884,215 B2 * | 1/2024 | Castro | B60R 1/26 |
| 12,032,273 B2 * | 7/2024 | Tobie | H04N 23/695 |
| 2018/0272976 A1 * | 9/2018 | Root | B60R 21/0134 |
| 2019/0308565 A1 * | 10/2019 | Da Deppo | B60R 11/04 |

* cited by examiner

*Primary Examiner* — Steven O Douglas
(74) *Attorney, Agent, or Firm* — Kenneth H. Jack; Davis & Jack, LLC

(57) ABSTRACT

An assembly for gating a truck load bed, the truck load bed having a laterally extending rear opening, the assembly incorporating a tailgate fitted for receipt within the load bed's rear opening, the tailgate incorporating a hollow bored lower member having an arcuately curved upper wall; the assembly further incorporating a camera case having an open lower end which is angularly mounted upon the hollow bored lower member's arcuately curved upper wall; the assembly further incorporating a camera cable passage port opening the hollow bored lower member at the arcuately curved upper wall, wherein the camera cable passage port communicates with the camera case's open lower end.

15 Claims, 5 Drawing Sheets

TRUCK TAILGATE ASSEMBLY

CLAIM OF PRIORITY FROM PREVIOUSLY FILED PROVISIONAL PATENT APPLICATION

This non-provisional patent application claims the benefit of and priority from U.S. Provisional Patent Application No. 63/309,747 filed Feb. 15, 2022. The inventor disclosed in and applicant of said provisional application is the same person as the person who is disclosed as the inventor in and applicant of the instant application. The applicant asserts that structures and functions of structures disclosed and described in the instant application are substantially identical to those disclosed in said provisional application.

FIELD OF THE INVENTION

This invention relates to truck tailgates. More particularly, this invention relates to pickup truck tailgates and assemblies thereof which are adapted for support and operation of a rearview video camera.

BACKGROUND OF THE INVENTION

Known and conventional means for mounting a miniature rearview video camera at the rearward end of a pickup truck often position a video camera at an excessively low elevation, at or near the pickup truck's rear bumper. Such installations often provide an improper rearview angle, and often undesirably expose the video camera to damage. Other known and conventional modes of mounting of pickup truck rearview cameras mount the camera at a higher elevation upon the truck's tailgate. However, such tailgate mounts typically provide insufficient support of the camera and undesirably expose the video camera to damage or expose the camera's power and video signal leads to damage.

The instant inventive truck tailgate assembly solves or ameliorates the above described problems and deficiencies by providing a tailgate assembly which incorporates a specialized camera containing and supporting case, and by including within the assembly a specialized mount of such case which securely supports and properly positions the camera while protecting the camera and its electrically conductive wire leads.

BRIEF SUMMARY OF THE INVENTION

A first structural component of the instant inventive truck tailgate assembly comprises a lower tailgate frame member. In a preferred embodiment, such frame member has a laterally extending hollow bore. The lower frame member suitably comprises a hollow bored aluminum tube having a "D" cross section. The arcuately curved wall of such "D" tube member may be advantageously oriented upwardly to allow a camera case to be conveniently mounted thereon at a selected view angle. In a preferred embodiment, the lower frame member substantially spans the full lateral width of the rear load bed opening of a pickup truck. Further structural components of the inventive pickup truck tailgate assembly comprise upper and lower wire passage ports. In a preferred embodiment, such ports respectively open the laterally extending hollow bore of the lower frame member at such member's upper and lower walls. In order to facilitate a central positioning of a miniature video camera at the rear of a truck, the upper wire passage port component preferably opens the lower frame member's hollow bore at a substantially central location along the frame member's lateral dimension.

A further structural component of the instant inventive pickup truck tailgate assembly comprises a case which is fixedly attached to the lower frame member's preferably arcuately curved upper wall. In a preferred embodiment, the case has a lower opening, and the case's fixed attachment to the lower frame member preferably aligns such lower opening in direct communication with the lower frame member's upper wire passage port.

Further structural components of the instant inventive tailgate assembly preferably support and house the miniature video camera within a tailgate mounted case. In a preferred embodiment, the case has a removable rear access plate. Where an access plate is provided, the assembly's video camera is advantageously mounted upon the interior of such plate so that a removal of the plate automatically extracts the camera from the case. A lens port or opening is preferably provided within the access plate, the video camera's lens being received within or aligned with such port in order to rearwardly direct the camera's view.

Further structural components of the instant inventive pickup truck tailgate assembly comprise a plurality of electrical wires which are connected operatively to the video camera for provision of electric power and for transmission of video image signals which are generated by the camera. In a preferred embodiment, such electrical wires extend downwardly from the access plate mounted video camera, then extending through the case's lower opening and through the lower frame member's upper wire passage port. Such wires then extend laterally a short distance along the lower frame member's hollow bore, then exiting outwardly through the lower wire passage port at the lower end of the tailgate.

The pickup truck tailgate assembly suitably further comprises left and right vertical frame members which extend upwardly from the left and right ends of the lower frame member, the frame further incorporating an upper laterally extending member spanning between the vertical members' upper ends. A matrix of laterally extending louvers is advantageously provided, such matrixes' louver members spanning laterally between the left and right vertical frame members. Where the space defined by the frame's peripheral frame members is filled by a louver matrix, a lowermost louver matrix member is preferably specially configured to present a rearwardly opening "C" slot. Close fitting of such slot to the peripheral dimensions of the camera case facilitates welded connections between the edges of the slot and the case, and allows the matrix's lower louver to thereby further support the camera case. Upon such welded slot connections, forward portions of the lower louver serve a case protecting function.

In operation of the instant inventive assembly, the plurality of electrical wires which serve the rearview camera remain protectively housed within the interiors of the case and the lower frame member. While the pickup truck tailgate occupies its downwardly pivoted and horizontally extending orientation, the tailgate's lower louver simultaneously protects and supports the camera case while the frame's lower frame member protectively houses the camera's wire leads. In such horizontal orientation, the camera's lead wires advantageously avoid any upward exposure at the upwardly facing surfaces of the tailgate.

Upon raising and closing the tailgate, the case and the camera supported within and upon the case are automatically oriented for achieving a proper rear video view from the pickup truck. In the raised orientation, the wire leads continue to be protected within the lower frame member's hollow bore while the forward edge of the lower louver protects and shields the camera case.

Accordingly, objects of instant invention include the provision of a truck tailgate assembly which incorporates structures as described above, and which arranges those structures in relation to each other in manners described above for achievement of the beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
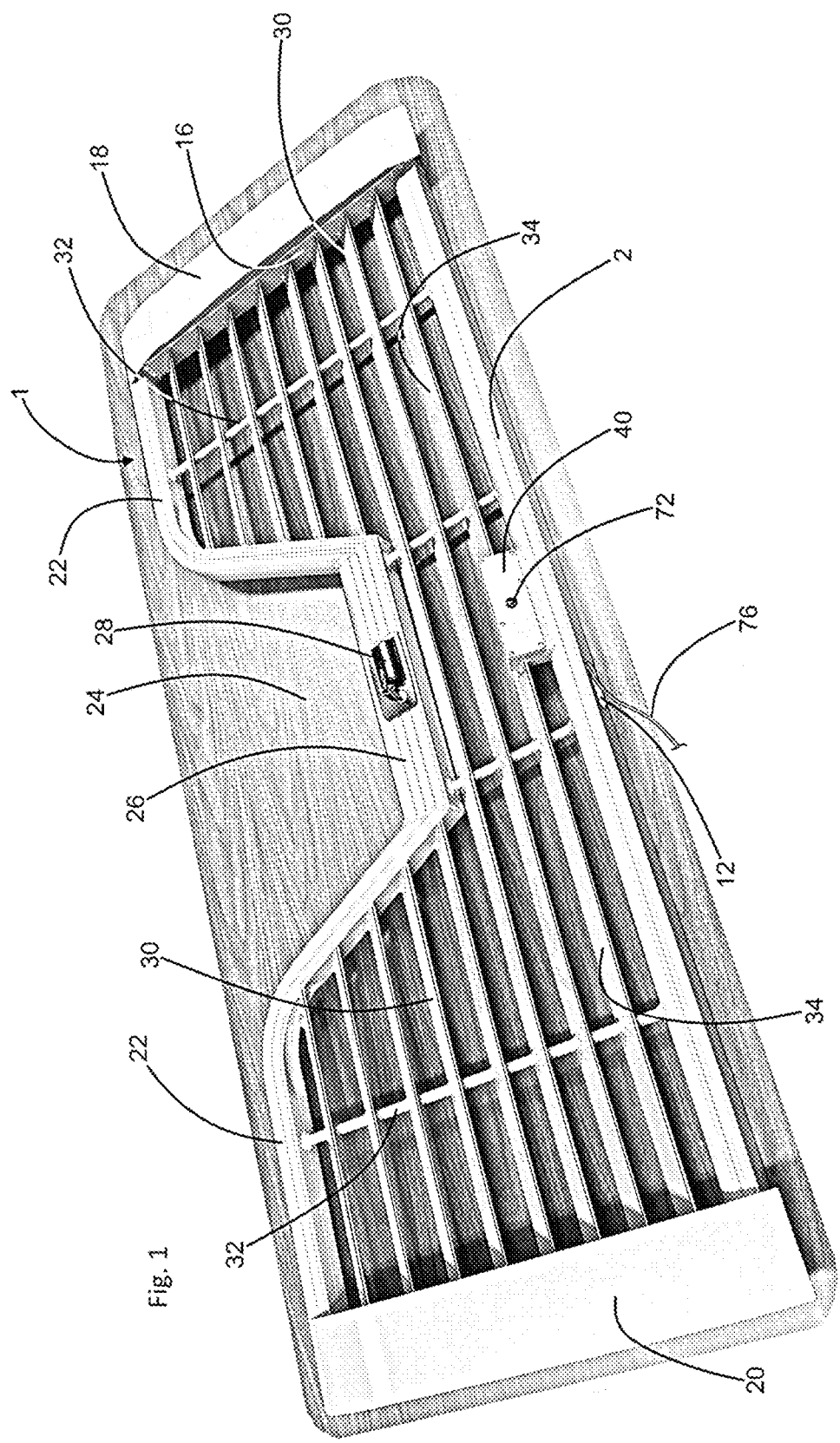
FIG. 1 is a perspective view of a preferred embodiment of the instant inventive truck tailgate assembly.

Referring now to the drawings and in particular to Drawing FIG. 1, a preferred embodiment of the instant inventive truck tailgate assembly is referred to generally by Reference Arrow 1. The exemplary assembly of the drawing figures is configured for mounting at the rear of a pickup truck's load bed. A major structural component of the assembly comprises a lower frame member 2 which spans laterally or from left to right, such member substantially spanning the entire lateral width of the rear opening of such pickup truck's load bed.

Referring simultaneously to FIGS. 1, 2, 4, and 5, the lower frame member 2 preferably has a "D" shaped cross-sectional shape which includes an arcuately curved upper wall 4 and a substantially flat lower wall 10. An upper wire leads passage port 8 opens the hollow interior 6 of the lower frame member 2 at the arcuately curved upper wall 4, and a lower wire leads passage port 12 further opens the hollow interior 6 at the lower wall 10. The lower wire leads passage port 12 is preferably laterally oblongated, as depicted, to allow for a laterally and upwardly angled passage therethrough of camera wire leads or conduits 76. In order to guard against wire abrasions, an elastomeric or plastic trim piece 14 lines the edges of the lower port 12.

Figure 4:
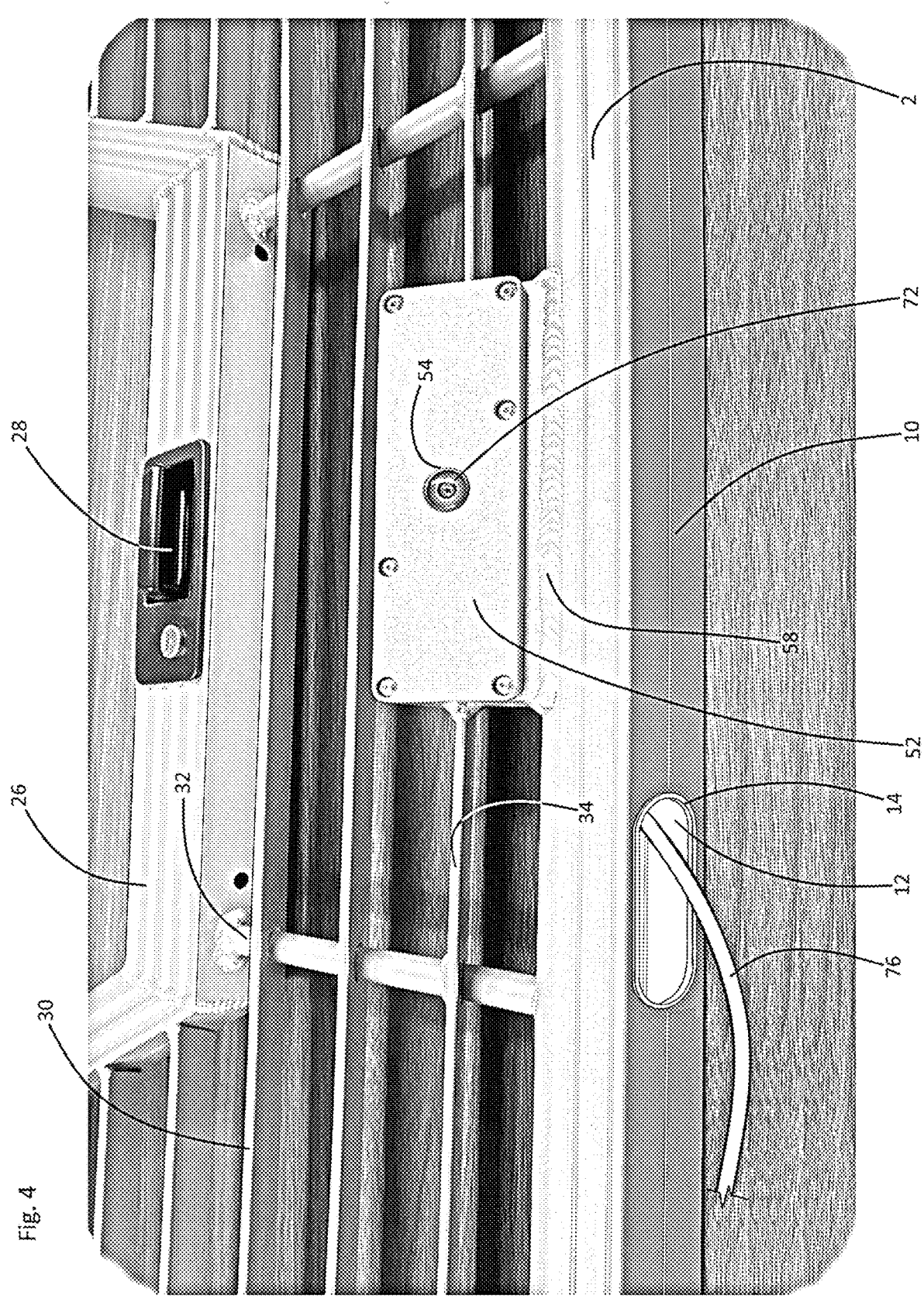
FIG. 4 is an alternative perspective view of the structures of FIG. 2.

In a preferred embodiment, the upper port 8 is substantially centrally located along the lateral dimension of the lower frame member 2, such positioning allowing for a substantially central mount of a case mounted video camera 70. As shown in FIGS. 1 and 4, the lower wire lead port 12 is offset leftwardly from the center of the lower frame member 2 to facilitate easy routing of and receipt of the camera wire leads 76. The portion of the lower frame member 2 through which the leads 76 laterally extend serves as and constitutes an electric wire protecting conduit in addition to its function as a structural frame member.

Further structural components of the instant inventive assembly comprise left and right vertical frame members 16 which are fixedly welded to and extend upwardly from left and right ends of the lower frame member 2. Right and left cover plates 18 and 20 aesthetically cover the right and left vertical frame member 16. An upper frame member 22 having a lowered middle section 26 spans between upper ends of the vertical frame members 16, the lowered section 26 forming and defining a trailer gooseneck passage opening 24. A latch 28 for selectively opening and closing the tailgate (via coaxial cable actuators, not within views) is provided at the lowered section 26. A matrix of laterally extending louvers 30 spans between the vertical frame members 16, such louvers being medially supported by support posts 32.

Figure 2:
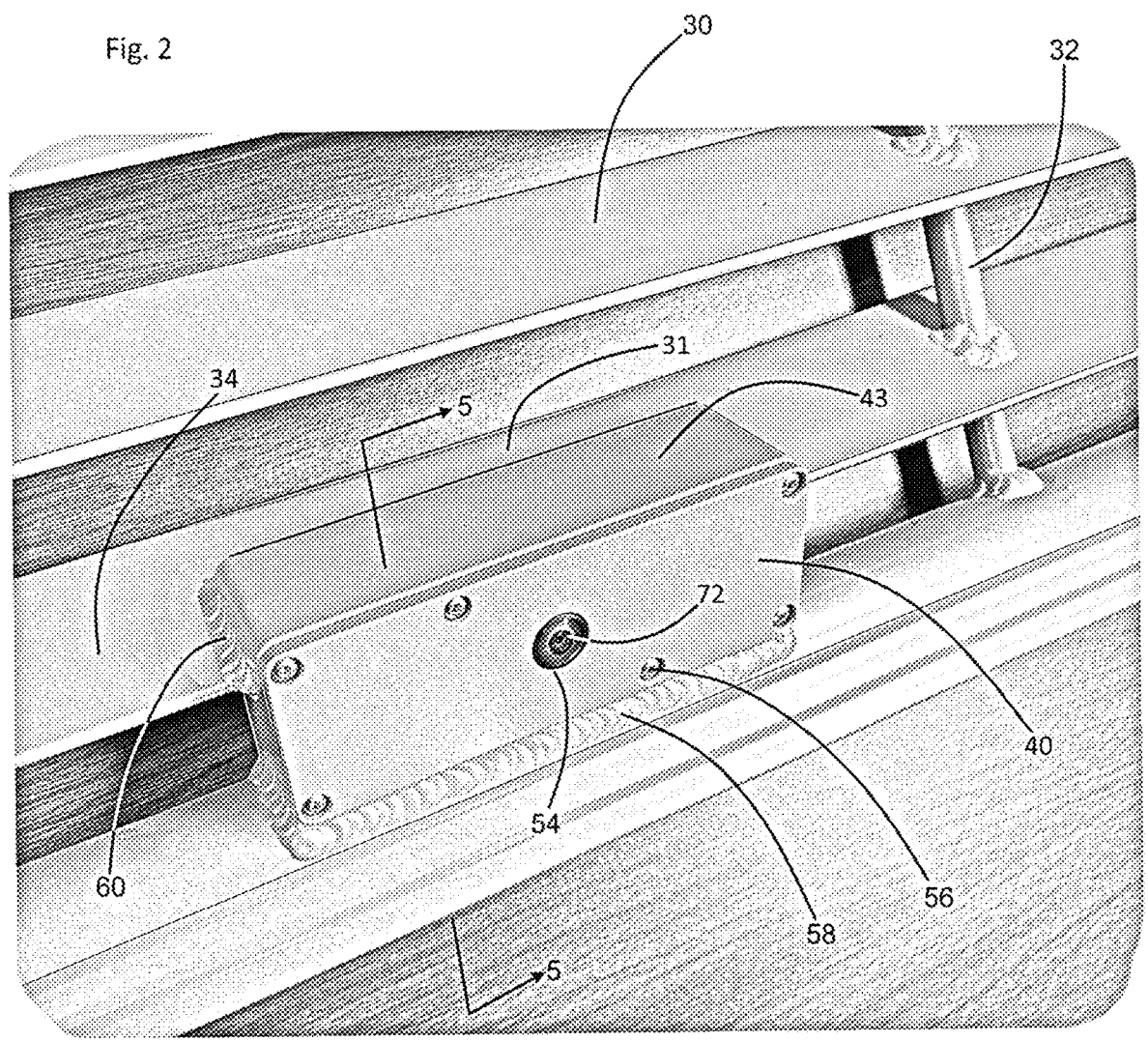
FIG. 2 is a magnified view of a portion of the structure depicted in FIG. 1.

A further structural component of the instant inventive assembly comprises a case which is referred to generally in Drawing FIG. 2 by reference arrow 42. The case 42 has an upper wall 43 and a forward wall 45, such walls defining a hollow interior camera housing space 44. Such space 44 is opened by a rearward port 46 which is removably covered by an access plate 40.

Figure 5:
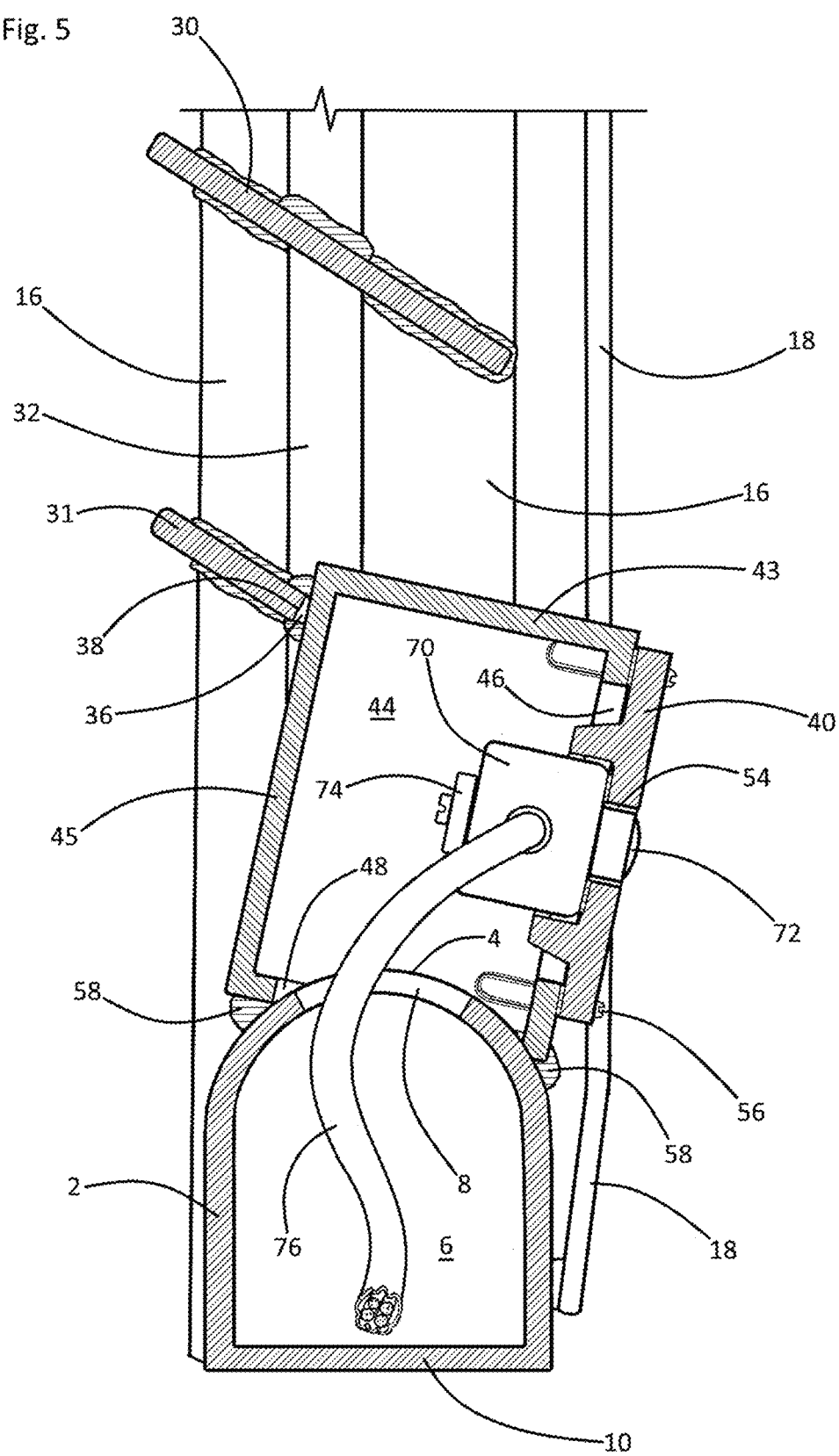
FIG. 5 is a partial sectional view, as indicated in FIG. 2.

The case 42 is downwardly opened by a lower port 48. As shown in FIG. 5, the arcuate upper wall 4 of the lower frame member 2 facilitates selectively angled positioning of the case 42 with respect to the lower frame member 2, the case being rigidly welded at a chosen angular position by welds 58. The front to rear dimension of port 48 is preferably greater than that of port 8 so that selective adjustments of the front to rear position of the case 42 with respect to the frame member 2 may selectively adjust the view angle of the internally mounted video camera 70. The underlying port 8 advantageously remains in communication with port 48 over a range of selectable view angles without any outward exposure of the edges of the port 8.

The rear cover plate 40 is preferably fitted for covering and closing the case's rear opening, such plate preferably being removably secured upon the case by screw fasteners 56. Such plate 40 preferably includes a video camera lens port 54 within which a video camera lens 72 of the video camera 70 is exposed. The plate 40 also preferably includes mounting brackets 74 which support the video camera 70. The preferred mount of the video camera 70 upon the forward or interior surface of the access plate 40 facilitates easy and convenient extraction and removal of the camera 70 from the case 42. Opening of the case 42 via rearward removal of the access plate 40 advantageously automatically extracts the camera 70 from the case 42.

The electrical wire leads 76 preferably include power and video signal cables which operatively serve the video camera 70. Such wire leads 76 extend downwardly from the video camera 70 to pass through the case's and lower frame member's aligned ports 48 and 8. The leads 76 then extend through and along the interior 6 of the frame member 2 to exit the frame member 2 downwardly and leftwardly via port 12. Further extension of the wire leads 76 (not depicted within views) communicate with the truck's electrical system, preferably extending to a dashboard mounted video screen.

Figure 3:
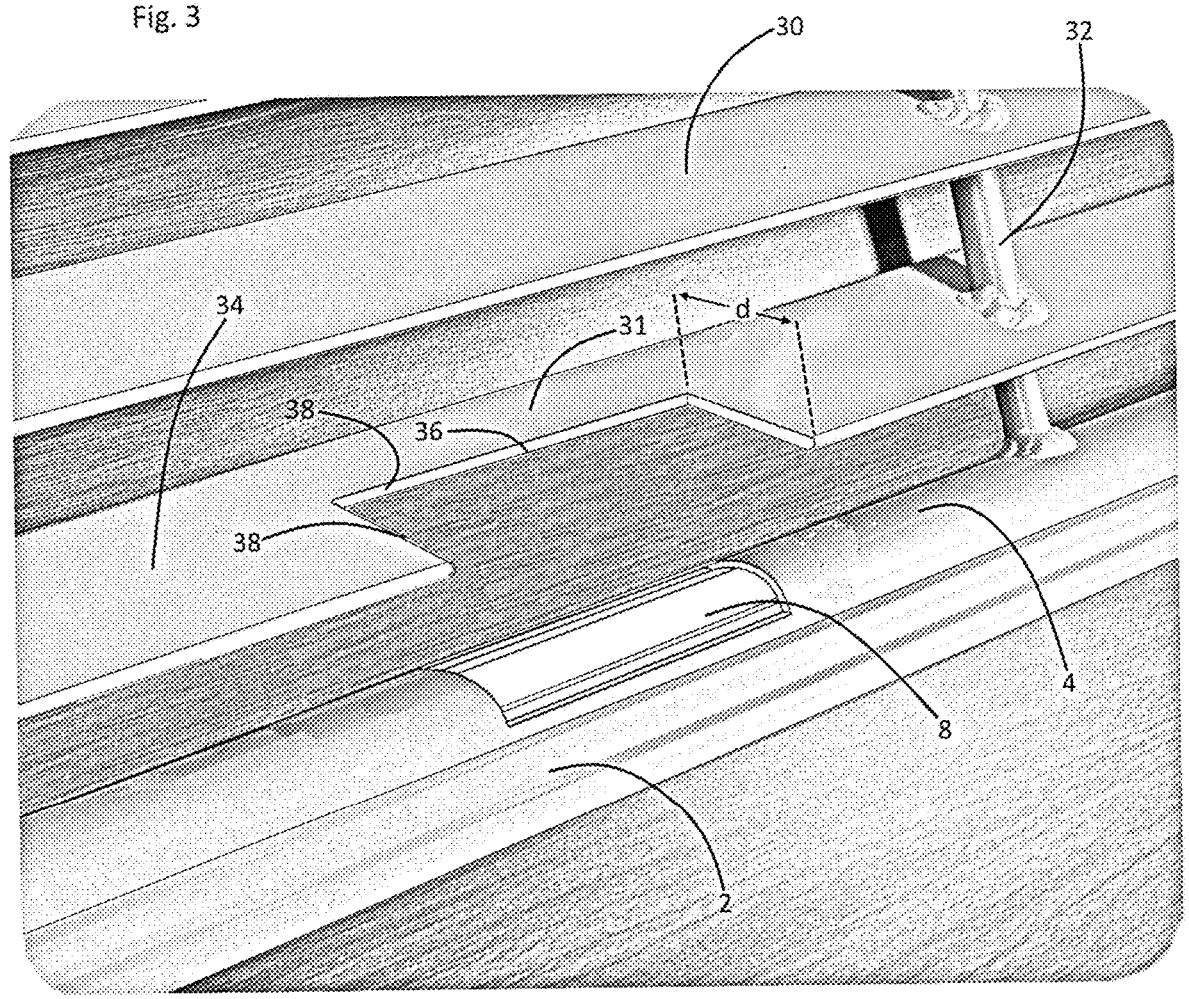
FIG. 3 redepicts the structure of FIG. 2, the view of FIG. 3 showing the assembly in a configuration which precedes incorporation of camera and camera case components.

Referring simultaneously to FIGS. 2 and 3, the frame matrix's lowermost louver 34 directly overlies the lower frame member 2, such lower louver advantageously rigidly supporting the case 42. A rearwardly opening "C" slot 36 presenting peripheral edges 38 may be cut and formed within the lowermost louver 34, such slot 36 preferably being closely fitted to the exterior dimensions of the case 42. Peripheral welds 60 formed along such edges 38 advantageously enhance the louvers' structural support of the case 42.

As indicated above, the view angle of the camera 70 may be selectively pointed or aimed by adjusting the front to rear position of the case 42 with respect to the underlying frame member 2. Referring in particular to FIGS. 3 and 5, to accommodate such front to rear positioning and view angle adjustment, the front to rear dimension "d" or depth of the "C" slot 36 may be correspondingly adjusted.

As shown in FIGS. 3 and 5, a forward portion 31 of the lower louver 34 forwardly overlies the "C" slot 36 and forwardly overlies the case 42 which is supported within such slot. While the tailgate is raised to its closed position, such forward portion 31 protects the camera case 42 from impacts with rearwardly sliding objects carried upon the truck's load bed. While the tailgate is lowered for use as a step surface, the forward portion 31 of the lower louver 34 alternatively protects against impingement of feet against the case 42.

In operation of the instant inventive tailgate, the interior 44 of the case 42, in combination with the hollow interior 6 of the lower frame member 2, functionally house and protect the electrical wire leads 76.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An assembly for gating a truck load bed, the truck load bed having a laterally extending rear opening, said assembly comprising:
    (a) a lower frame member, said member being laterally sized for receipt within the laterally extending rear opening of the truck bed;
    (b) a case having a plurality of walls, the case being fixedly attached to and extending upwardly from the lower frame member; and
    (c) a video camera housed within the case.

2. The assembly of claim 1 wherein the plurality of walls of the case comprise a rear wall, wherein the case is opened by a port positioned at the rear wall, and wherein the video camera has a lens exposed at said port.

3. The assembly of claim 2 wherein the case comprises a rear opening, and wherein the rear wall comprises an access plate fitted for closing the rear opening.

4. The assembly of claim 3 further comprising a mounting bracket adapted for supporting the video camera, wherein the mounting bracket operatively spans between the video camera and the access plate.

5. The assembly of claim 1 wherein the case has lower port, and further comprising a wire lead operatively connected to the video camera, wherein the wire lead extends through the lower port.

6. The assembly of claim 5 wherein the lower frame member has a hollow bore, wherein said bore is opened by an upper port, wherein the upper port communicates with the lower port of the case, and wherein the wire lead further extends through the upper port.

7. The assembly of claim 6 wherein the hollow bore of the lower frame member is further opened by a lower passage, wherein the wire lead further extends laterally along the hollow bore of the lower frame member, and wherein the wire lead further extends through the lower passage.

8. The assembly of claim 7 wherein the lower frame member has a "D" configured cross section.

9. An assembly for gating a truck load bed, the truck load bed having a laterally extending rear opening, said assembly comprising:
    (a) a conduit having an upper opening, the conduit being laterally fitted for receipt within the laterally extending rear opening of the load bed of the truck;
    (b) a matrix of laterally extending members including a lowermost laterally extending member, said matrix of members being fixedly attached to and extending upwardly from the conduit;
    (c) a camera case and video camera combination, wherein the camera case is mounted between the conduit and said lowermost member; and,
    (d) a wire lead connected operatively to the video camera, wherein the wire lead extends through the upper opening of the conduit.

10. The assembly of claim 9 wherein the lowermost laterally extending member comprises louver, and further comprising a rearwardly opening slot extending forwardly into said louver, wherein the camera case is nestingly received within said slot.

11. The assembly of claim 10 wherein the conduit is further opened by a lower passage, and wherein the wire lead further extends laterally along the conduit and through the lower passage.

12. An assembly for gating a truck load bed, the truck load bed having a laterally extending rear opening, said assembly comprising:
    (a) a tailgate fitted for receipt within the laterally extending rear opening of the truck load bed, the tailgate comprising a hollow bored lower member having an arcuately curved upper wall;
    (b) a camera case having an open lower end, the camera case being angularly mounted at its lower end upon the arcuately curved upper wall; and
    (c) a camera cable passage port, wherein said port opens the hollow bored lower member at the arcuately curved upper wall, and wherein said port communicates with the camera case's open lower end of the camera case.

13. The assembly of claim 12 wherein the tailgate comprises a lower louver, and further comprising a slot extending forwardly into and opening rearwardly at the lower louver, wherein the camera case is nestingly received within the slot.

14. The assembly of claim 13 wherein the camera case is closed by a rear access plate, and further comprising a video camera housed within the camera case, wherein the video camera is removably mounted upon an interior surface of said plate.

15. The assembly of claim 14 wherein the camera case is opened by a camera lens port, said port extending through the access plate.

* * * * *